United States Patent
Tanner et al.

(10) Patent No.: US 11,206,358 B1
(45) Date of Patent: *Dec. 21, 2021

(54) AUTOEXPOSURE CONTROL FOR MULTI-IMAGER SYSTEM SYNCHRONIZED TO A SINGLE IMAGER

(71) Applicant: Altia Systems, Inc., Cupertino, CA (US)

(72) Inventors: Jason Daniel Tanner, Folsom, CA (US); Atif Matin Sarwari, Saratoga, CA (US)

(73) Assignee: Altia Systems Inc, Cupertino, CA (US)

(*) Notice: Subject to any disclaimer, the term of this patent is extended or adjusted under 35 U.S.C. 154(b) by 364 days.

This patent is subject to a terminal disclaimer.

(21) Appl. No.: 14/093,389

(22) Filed: Nov. 29, 2013

Related U.S. Application Data

(60) Provisional application No. 61/731,364, filed on Nov. 29, 2012.

(51) Int. Cl.
*H04N 5/235* (2006.01)
*H04N 5/232* (2006.01)

(52) U.S. Cl.
CPC ....... *H04N 5/2351* (2013.01); *H04N 5/23238* (2013.01)

(58) Field of Classification Search
CPC ....... H04N 7/005; H04N 3/30; H04N 5/23238
See application file for complete search history.

(56) References Cited

U.S. PATENT DOCUMENTS

| | | | | |
|---|---|---|---|---|
| 8,754,941 B1* | 6/2014 | Sarwari | ............. | H04N 5/23229 348/143 |
| 9,497,386 B1* | 11/2016 | Sarwari | ............. | H04N 7/18 |
| 2003/0063774 A1* | 4/2003 | Oizumi | ............. | G06T 7/30 382/104 |
| 2004/0136498 A1* | 7/2004 | Omernick | ............. | H05G 1/30 378/109 |
| 2006/0268131 A1* | 11/2006 | Cutler | ............. | G06T 5/008 348/239 |
| 2008/0089580 A1* | 4/2008 | Marcu | ............. | H04N 1/603 382/162 |
| 2008/0277473 A1* | 11/2008 | Kotlarsky | ............. | G06K 7/10752 235/462.07 |
| 2009/0284616 A1* | 11/2009 | Daiku | ............. | H04N 5/217 348/229.1 |
| 2010/0091176 A1* | 4/2010 | Cha | ............. | H04N 5/238 348/365 |
| 2010/0097493 A1* | 4/2010 | Asoma | ............. | H04N 5/235 348/229.1 |
| 2010/0188526 A1* | 7/2010 | Origuchi | ............. | H04N 5/2352 348/229.1 |

(Continued)

FOREIGN PATENT DOCUMENTS

EP    2414989    * 9/2010

*Primary Examiner* — Md N Haque
(74) *Attorney, Agent, or Firm* — HM Law Group LLP; Vani Moodley, Esq

(57) ABSTRACT

A method for auto-exposure control in a multi-imager system is disclosed. The method comprises using an auto exposure control circuit of a first imager to set exposure control parameters based on a target brightness; and selectively adjusting the target brightness based on difference in brightness between the images from the first imager and images from other imagers in the system.

9 Claims, 2 Drawing Sheets

(56) References Cited

U.S. PATENT DOCUMENTS

| | | | | |
|---|---|---|---|---|
| 2010/0265342 A1* | 10/2010 | Liang | ............... | H04N 9/735 |
| | | | | 348/208.4 |
| 2011/0024505 A1* | 2/2011 | Wang | ............... | G06K 7/14 |
| | | | | 235/462.41 |
| 2012/0062694 A1* | 3/2012 | Muramatsu | ............... | G06T 5/50 |
| | | | | 348/36 |
| 2013/0033583 A1* | 2/2013 | Lee | ............... | H04N 13/31 |
| | | | | 348/47 |
| 2013/0107048 A1* | 5/2013 | Rottner | ............... | H04N 5/23238 |
| | | | | 348/148 |

* cited by examiner

AUTOEXPOSURE CONTROL FOR MULTI-IMAGER SYSTEM SYNCHRONIZED TO A SINGLE IMAGER

PRIORITY

This application claims the benefit of priority to U.S. Provisional Patent Application No. 61/731,364 filed Nov. 29, 2013, the entire specification and drawings of which are incorporated herein by reference.

FIELD

Embodiments of the invention relate generally to multiple imager systems. In particular, embodiments of the invention relate to exposure control for a multiple imager system.

BACKGROUND

In a single imager system comprising a single imager/sensor, auto exposure may be realized using an auto exposure algorithm that is tuned to the single imager. However, in the case of a multiple imager system, the approach of using an auto exposure algorithm for each imager/sensor can result in each imager having a different exposure. The exposure difference would show in video with each imager being darker or brighter than its neighboring imager.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

A method auto-exposure control in a multi-imager system is disclosed. The method comprises using an auto exposure control circuit of a first imager to set exposure control parameters based on a target brightness; and selectively adjusting the target brightness based on difference in brightness between the images from the first imager and images from other imagers in the system.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
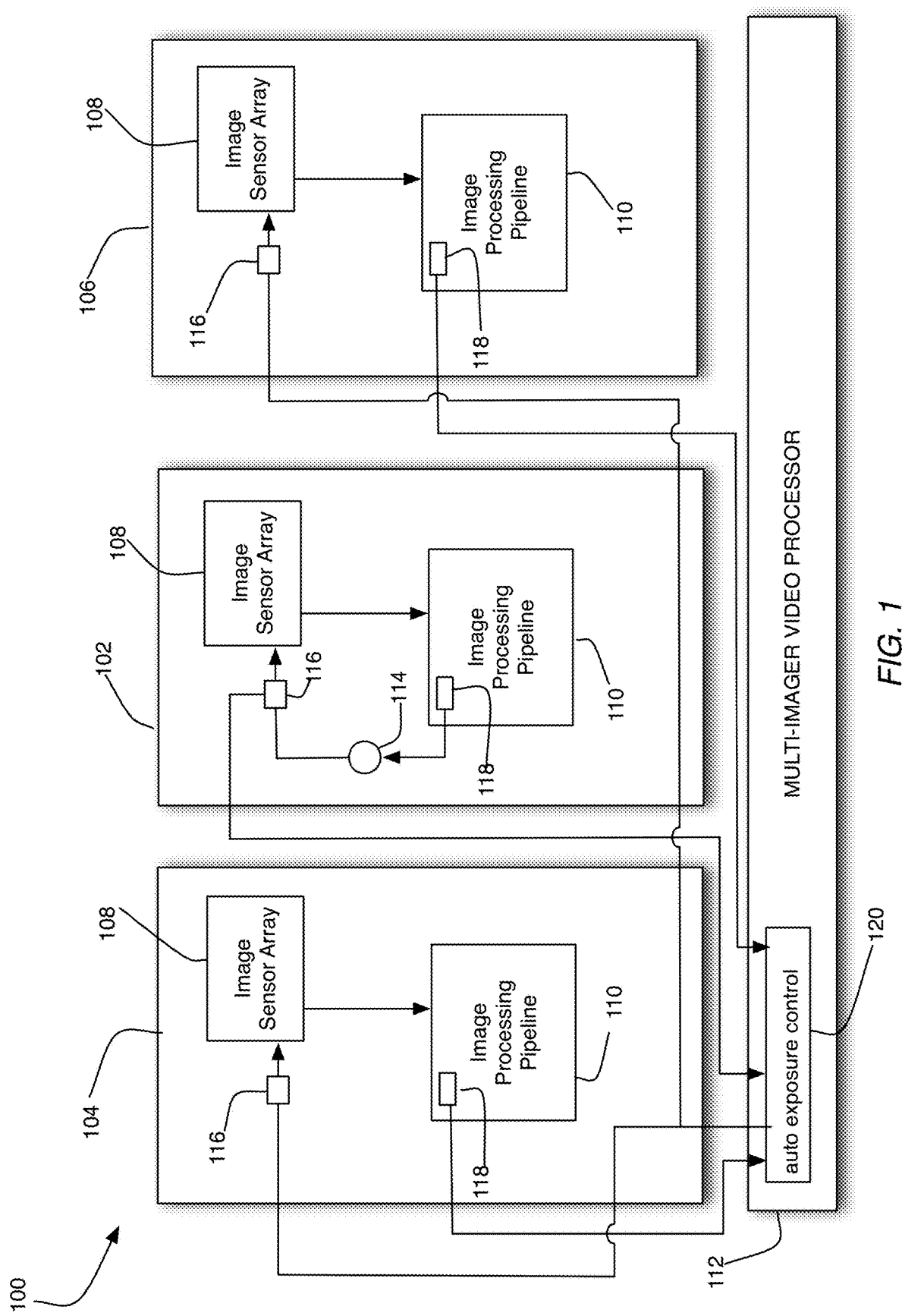
FIG. 1 shows a high-level block diagram of a multi imager system in accordance with one embodiment of the invention.

FIG. 1 shows a high-level block diagram of a multi-imager system 100, in accordance with one embodiment of the invention. It is to be understood, that the system is representative of a panoramic camera capable of generating panoramic video by stitching together images from each of its imagers/sensors. However, many of the components of the system have not been shown so as not to obscure the present invention.

The system 100 may include N imagers although only three imagers 102, 104, and 106 have been shown. The imager 104 is referred to the "center imager" as it is centrally positioned within the system and includes imagers to its left and to its right.

Each imager includes an image sensor array 108 mounted directed to capture a portion of a scene. In one embodiment, each image sensor array 108 may include a charge-coupled device (CCD) or complimentary metal-oxide semiconductor (CMOS) imaging sensors, as is known in the art.

In one embodiment, each of the image senor arrays 108 sensors may be configured to output raw pixels in a Bayer pattern to an image-processing pipeline 110. In accordance with different embodiments, the pipeline 110 may include process steps for lens shading, noise reduction, de-mosaicing, color correction, gamma correction, etc.

The pipelines 110 may output YCbCr pixels to a multi-imager video processor 112 for further processing including stitching or blending to generate panoramic video.

For auto-exposure control the center imager 102 includes auto-exposure control circuit. In one embodiment, the exposure control circuit may be realized as a software processor 114. Functionally, the processor 114 generates exposure control parameters 116 for each of the image sensor arrays 108 in cooperation with auto exposure control circuit 120 located within the multi-imager video processor 112, as will be explained in greater detail below.

Besides the center imager 102, the remaining imagers either do have an exposure control circuit or have said circuit turned off. In effect auto-exposure control within the system 100 is synchronized to the center imager 102, as will be explained below.

In one embodiment, each imager is configured to collect brightness statistics 118. Each set of brightness statistics 118 provide a measure of the brightness of the portion of a scene being captured by its corresponding image sensor array 108. The brightness statistics 118 may be in a range, e.g. 1 to 100 and be specified in units of $cd/m^2$, the lower the value the darker the portion of the scene. In one embodiment, the brightness statistics may be computed based on a histogram of pixel brightness values for pixels output by the image sensor array 108.

In one embodiment, the processor 114 is configured to initially set the exposure control parameters 116 based a target brightness, which may be input by a user. In one embodiment, the exposure control parameters 116 may include integration time and a gain parameter, whose values are determined by the target brightness.

Figure 2:
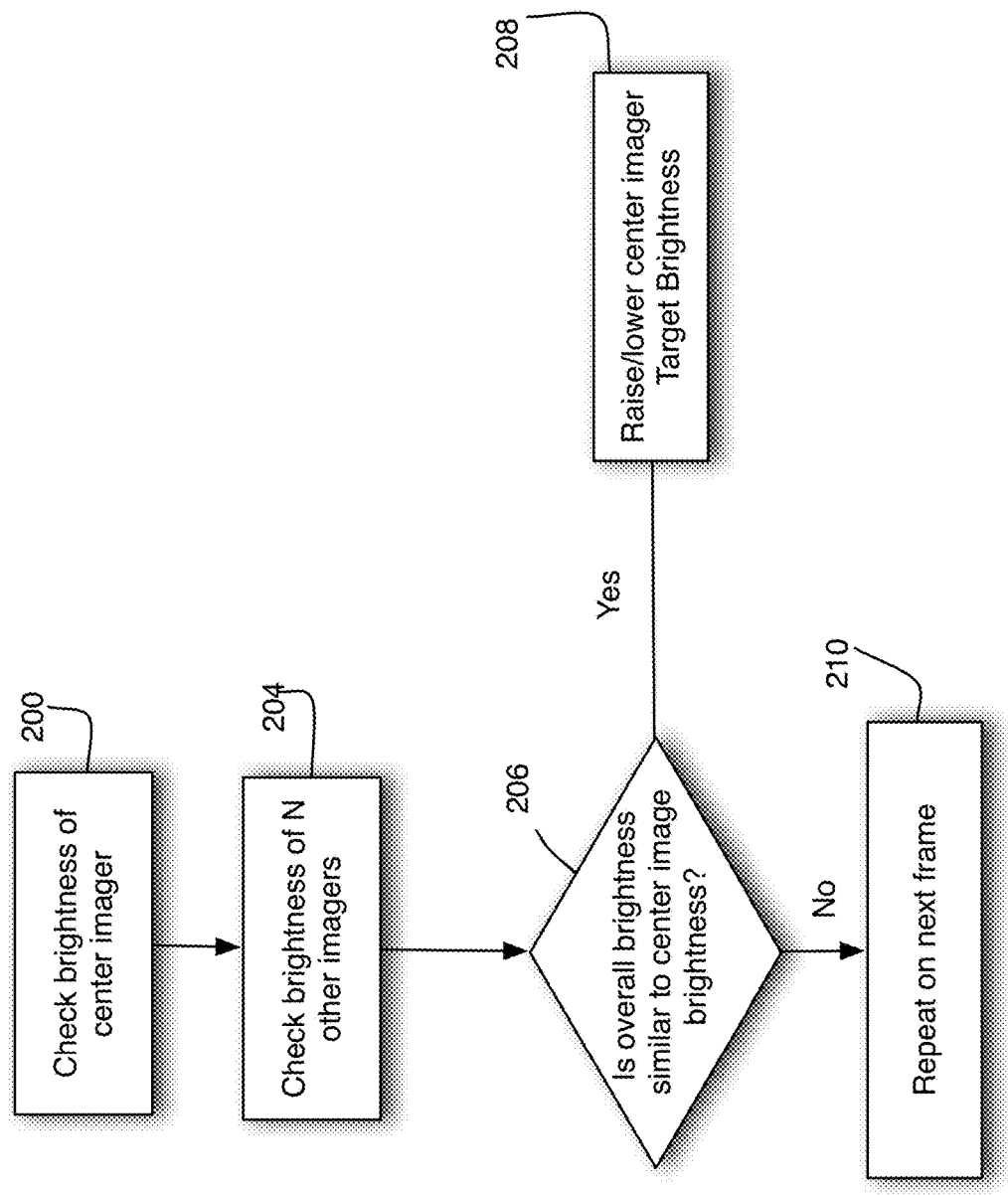
FIG. 2 shows a flowchart for tuning auto exposure control, in accordance with one embodiment of the invention.

FIG. 2 shows a flowchart for adjusting the target brightness, in accordance with one embodiment. Referring to FIG. 2, at block 200 the processor 114 and/or the auto exposure circuit 120 checks the brightness of the center imager. For this step the brightness of the center imager is obtained from the corresponding brightness statistics 118. At block 202, the processor 114 and/or the circuit 120 checks the brightness for each of the remaining N imagers. At 204, the overall brightness is compared to the brightness of the center imager. In one embodiment, the overall brightness may be computed as the average brightness of the remaining N imagers excluding the center imager. If the brightness of the center imager is higher than the overall brightness by a threshold value (e.g. say 5) then the target brightness is raised at block 208 by an amount equal to the difference. This has the effect of making the image corresponding to the center imager brighter while improving the exposure for the remaining images. Likewise, if the brightness of the center imager is lower than the overall brightness by the threshold value then the target brightness is lowered by an amount equal to the difference. This has the effect of making the image corresponding to the center imager darker while improving the exposure for the remaining imagers. In one embodiment, the changes to the target brightness may achieved in a phased manner, for example 20% of total required change per frame.

Advantageously, embodiments of the invention use a single imager for auto-exposure control while taking into account the overall brightness of each scene.

In one embodiment, if the brightness of the center imager is the same or similar to the overall brightness (i.e. the difference is within the threshold) then nothing is done or if the target brightness was previously adjusted then it is returned to its default setting.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for auto-exposure control in a multi-imager system, comprising:
   selecting one imager for exposure control; generating by an auto exposure control circuit of the selected imager, system-wide exposure control parameters based on a target brightness; and synchronizing each of the remaining imagers of the multi-imager system to operate using the system-wide exposure control parameters, wherein the target brightness is selectively adjusted by increasing the target brightness by a threshold value, if a brightness value of the selected imager is higher than an average brightness value of the remaining imagers other than the selected imager;
   wherein the threshold value is equal to a difference in the brightness value of the selected imager and the average brightness value.

2. The method of claim 1, wherein selectively adjusting the target brightness comprises setting adjusted exposure control parameters based on the adjusted target brightness.

3. The method of claim 1, wherein the threshold value is 5.

4. The method of claim 1, wherein selectively adjusting the target brightness comprises decreasing the target brightness by the threshold value, if the brightness associated with the first imager is lower than the average brightness value of imagers other than the selected imager.

5. A multi-imager system, comprising:
   a plurality of imagers each comprising an auto exposure control circuit, wherein the multi imager
   system is configured to:
   select one imager for exposure control;
   generate by an exposure control circuitry of the selected imager, system-wide exposure control parameters based on a target brightness; and
   synchronize each of the remaining imagers of the multi-imager system to operate using the system-wide exposure control parameters, wherein the target brightness is selectively adjusted by increasing the target brightness by a threshold value, if a brightness value of the selected imager is higher than an average brightness value of the remaining imagers other than the selected imager; wherein the threshold value is equal to a difference in the brightness value of the selected imager and the average brightness value.

6. The system of claim 5, wherein the threshold value is 5.

7. The system of claim 5, wherein selectively adjusting the target brightness comprises decreasing the target brightness by the threshold value, if the brightness value associated with the selected imager is lower than the average brightness value of the remaining imagers than the selected imager.

8. The method of claim 1, wherein synchronizing each of the remaining imagers comprises deactivating exposure control circuitry associated with each remaining imager; and feeding the system-wide exposure control parameters to said remaining imager.

9. The method of claim 5, wherein synchronizing each of the remaining imagers comprises deactivating exposure control circuitry associated with each remaining imager; and feeding the system-wide exposure control parameters to said remaining imager.

* * * * *